UNITED STATES PATENT OFFICE.

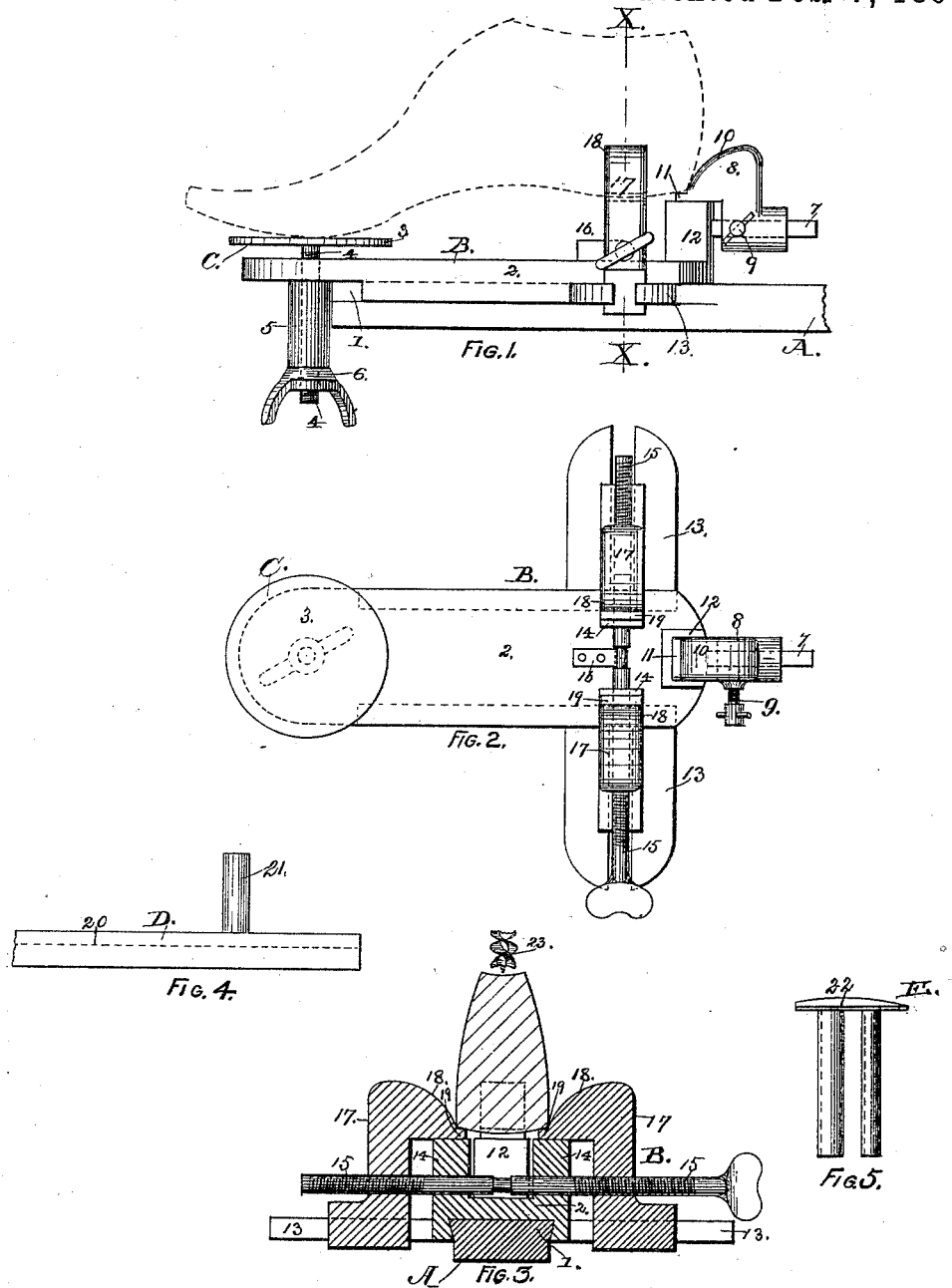

DANIEL C. REBHUN, OF ALBANY, NEW YORK.

MACHINERY FOR BORING LASTS.

SPECIFICATION forming part of Letters Patent No. 491,493, dated February 7, 1893.

Application filed February 5, 1890. Renewed March 7, 1892. Serial No. 424,028. (No model.)

*To all whom it may concern:*

Be it known that I, DANIEL C. REBHUN, of the city and county of Albany, in the State of New York, have invented new and useful Improvements in Machinery for Boring Lasts, of which the following is a specification.

My invention relates to improvements in mechanism for positing and holding lasts in boring-machines preparatory to, and during the operation of, boring the lasts for the reception of metallic heel-plates; and the object of my invention is to provide facilities whereby the lasts will always be brought into position in the boring-machine to effect the boring in a perfectly uniform and correct manner, and so that the holes will not require a subsequent trimming to enable the sleeves or studs of a heel-plate to be inserted therein so as to produce a sufficiently close fit to retain the heel-plates in place. I attain this object by the mechanism illustrated in the accompanying drawings, which are herein referred to and form part of this specification, and in which Figure 1 is a side elevation of my chuck for holding a last during the operation of boring the preliminary hole for the heel-plate, the position of the last in said chuck being indicated by dotted lines; Fig. 2 is a plan view of my chuck; Fig. 3 is a vertical section of my chuck, at the line X X on Fig. 1, with a last in position thereon; Fig. 4 is a side elevation of a jack or supplementary chuck for holding a last during the operation of boring the final hole for the heel-plate; and Fig. 5 is a side elevation of the metallic heel-plate for lasts.

Heretofore much difficulty has been encountered in boring lasts, for the reception of the heel-plates, in such manner that the two holes would be in the required positions and parallel with each other, and for that reason a large portion of the work has proved so defective that it has occasioned a considerable loss of time and material to effect even a partial remedy, and, where a great number of lasts of the same size and pattern have been required, the remedying of this defect has proved to be a most serious matter; but my invention provides a simple means for avoiding this defect, and enables the workmen to perform their work in a perfectly uniform manner, and at a greatly reduced cost in comparison with the ordinary manner of performing the same work.

As represented in the drawings, A designates an arm of the frame-work of a boring-machine of a common and well-known construction, said arm being directly under, and at right angles to, the center line of the shaft or spindle which carries the boring-tool; said arm is preferably provided with a dovetail head, 1, so as to adapt it to receive different appliances for holding the work; but said boring-machine forms no part of my invention.

B designates my chuck for holding a last during the operation of boring holes for the heel-plate; said chuck embraces the following parts; A bed-piece, 2, which is fitted to engage on the arm A of the boring-machine, and is provided, at its forward end, with an adjustable toe-rest, C, upon which the ball of the last will set while the last is being bored; said toe-rest consists of a plate, 3, provided with a pendent screw, 4, which is attached thereto, and which is fitted to screw into a boss or sleeve, 5, of the bed-piece 2, so that said toe-rest can be adjusted vertically to suit the form of the last; a jam-nut, 6, is fitted on the screw 4 to secure the toe-rest against any accidental derangement of its vertical adjustment; at the rearmost end of the bed-piece, an arm, 7, is formed to receive an adjustable-heel-guide or rest, 8, which is fitted to slide on said arm—toward and from the center-line of the spindle of the boring-machine—to suit the size and form of different lasts, and said heel-guide is provided with a binding-screw, 9, or other device for securing it in its place when adjusted to any particular form of last; said heel-guide is also provided with a head, 10, which curves upwardly from a lip, or horizontal flange, 11, which bears upon a block, 12, which is formed on the bed-piece, and from which the arm 7 protrudes; the lip 11 and the upward swell of the head 10 form a seat and guide for the rearmost portion of the heel of the last. The bed-piece 2 is provided with oppositely-located lateral guides, 13, near its rearmost end, and with corresponding bearing-blocks, 14, whose upper face is at or near the same level as the block 12, said bearing-blocks forming journal bearings for an adjusting-screw, 15, whose projecting ends are respectively provided with a right- and a left-hand screw-thread; said screw being prevented from moving endwise by a stop-bearing, 16, or other suitable means. The bed-piece 2 is provided with a pair of side-guides, 17, fitted to slide in the lateral guides 13, and arranged to bear against the sides of the heel of the last so as to bring the latter into the required position in respect to the center line of the spindle of the boring-machine; one of said side-guides is fitted to engage on the right-hand thread, and the other on the left-hand thread, of the adjusting-screw 15, so that said guides will be simultaneously moved, either farther apart, or closer together, according to the direction in which the adjusting-screw is turned; each of said side-guides is provided with an upwardly-curved head, 18, whose lower part joins a horizontal flange, 19, which forms a seat for receiving the lower face of the heel of the last, and the point of intersection of said flange with the curve of said head forming a guide whereby the heel of the last will be taken and retained in a true position, in respect to the center of the boring spindle, during the operation of boring the first hole in the heel; by this means provision is made—when the heel-guides have been adjusted for boring a particular size and form of last—for instantly bringing to the required position any number of the same size and form of last in successive order. The level of the flanges 11 and 19 is on the same plane, and is unalterable, so that the heels of all of the lasts will be brought to the same level, but provision is made for compensating for the difference in the height of heels of lasts—in respect to the level of the ball—by means of the adjustable-toe-rest C, whereby the toe of a last can be raised or lowered, as occasion requires, to bring the last in correct position for boring the first hole therein to suit the conformation of the last.

The heel-guide 8 is adjustable—inwardly and outwardly, as occasion may require—to bring the last into position, in respect to the center of the spindle of the boring-machine, where the first hole in the heel of the last is required to be bored; the side-guides 17 are adjustable from and toward the center line of the bed-piece 2, so that the lower edges of the heel of the last—at each side—will snugly fit between them; and when these adjustments have been completed my chuck is in condition to centralize any number of lasts of the same size and pattern in such manner that the first hole in all will be bored uniformly in the same place and position.

D designates a chuck or jack for holding the last while the second hole in the heel of the last is made; said chuck is designed to slide on the arm A of the boring-machine after the chuck B has been removed therefrom, and it consists of a bed-piece, 20, which has a dovetail-groove in its lower side, which is fitted to engage on the head 1 of the arm A; said bed-piece has, on its upper face, a stud or guide-pin, 21, which stands erect thereon in a position that is eccentric to the center-line of the spindle of the boring-machine to a degree which corresponds to the distance required between the holes bored in the heel of the last; said guide-pin is made to fit snugly into the hole first bored in the last for receiving the heel-plate, and it serves as a guide whereby the last is brought into an exact position under the spindle of the boring-machine for correctly locating the second hole bored in the last for receiving the heel-plate, so that any number of lasts, in which the first hole has been bored for the reception of the heel-plate, can be centered under the spindle of the boring-machine in an expeditious and correct manner.

E is a metallic heel-plate for a last, and is of the form for which my invention is designed for preparing the last; it consists of a plate, 22, which is provided with two sleeves that are integral with said plate, said sleeves being adapted to fit upon the pins of a jack of a heeling-machine. Said heel-plate is applied to the heel of a last for the purpose of protecting the latter from injury by the extreme pressure exerted by the heeling-machine in attaching the heels to boots and shoes, but it should be understood that said heel-plate forms no part of my invention, which only relates to machinery for boring the heels of lasts as a step preparatory to attaching said heel-plates.

When the heel-guide, side-guides, and toe-rest have been adjusted to their several positions for the reception of any particular size and form of last, the operation of my chuck B, will be as follows; The lasts are successively inserted between the side-guides 17, with the rearmost edge of the heel bearing against the heel-guide 8 and the ball of the last bearing on the toe-rest C, thereby centralizing the heel of the last under the boring-bit 23 of the boring-machine—the lower part of said bit being shown in Fig. 3—so that each of the first holes bored in every last will be in the required position for correctly locating the heel-plate thereon; when the boring of the first holes is completed in a lot of lasts of the same size and form, the chuck B is removed from the boring-machine, and the chuck D substituted therefor, the lasts are successively fixed on the guide-pin 21 of said chuck, by which the heel of the last will be centralized—under the boring-bit 23—in a correct position for boring the second hole required for receiving the heel-plate E, and in this manner the boring of the holes in the lasts is effected very correctly and at a great saving of time and expense as compared with the methods heretofore employed for performing this work.

What I claim as my invention and desire to secure by Letters Patent is—

In a heel-boring mechanism of the character herein described, the chuck B provided with a vertically adjustable toe-rest, C, an adjustable heel-guide, 8, and adjustable side-guides, 17; whereby said chuck can be adjusted for receiving, centralizing, and retaining in position—during the operation of boring the first heel-plate holes—lasts of different sizes and forms, as and for the purpose herein specified.

DANIEL C. REBHUN.

Witnesses:
CHARLES L. ALLEN,
WM. H. LOW.